Dec. 13, 1960  J. D. MOULTON  2,964,582
SINTERED PLATE FOR ALKALINE STORAGE BATTERIES
Filed July 28, 1958
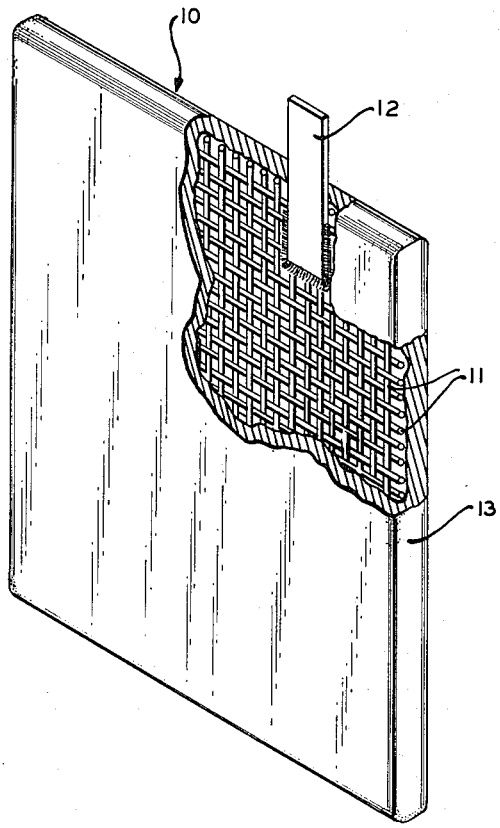
INVENTOR.
JOSEPH DONALD MOULTON
BY
George H. Fritzinge
AGENT

2,964,582
SINTERED PLATE FOR ALKALINE STORAGE BATTERIES

Joseph Donald Moulton, West Orange, N.J., assignor, by mesne assignments, to The Electric Storage Battery Company, Philadelphia, Pa., a corporation of New Jersey Filed July 28, 1958, Ser. No. 751,124

1 Claim. (Cl. 136—36)

This invention relates to porous sintered bodies shaped for use as the carrier of the active material of electrodes of alkaline storage cells, and particularly it relates to improved porous sintered plaques, and to the method of producing the same. The invention is especially useful in nickel-cadmium-alkaline and nickel-iron-alkaline storage cells, but no unnecessary limitation to such alkaline cells is intended.

In the manufacturing of sintered plaques for alkaline storage cells, a finely divided nickel powder is spread out into a thin plate-like formation, with or without an intermediate reinforcing metal screen, and is then sintered at an elevated temperature in an atmosphere of hydrogen to form a porous self-supporting structure. Thereupon, such porous plaque is filled in any suitable way with an active material. For purposes of the invention, the term "nickel powder" is herein used to mean substantially pure finely-divided nickel metal plus from 0% to 50% by weight of nickel oxide. The powdered nickel metal may be obtained as by thermal decomposition of nickel carbonyl, by reduction of nickel compounds or by mechanically pulverizing essentially pure nickel metal.

The handling of nickel powder prior to the sintering operation has been difficult because this powder does not have good dry-flow properties, making it difficult and time consuming to spread a layer of the powder uniformly and with an even surface, as into a mold or onto a screen or wire mesh grid, and of filling the interstices thereof. As a result, great care and experience have been required in order to avoid serious imperfections in the sintered product.

It has been found that nickel powder—with or without nickel oxide as an initial sintering ingredient—can be provided with very good dry-flow properties so as to circumvent the above mentioned difficulties. This is accomplished in accordance with the invention by adding a processing agent to the nickel powder of either polyvinyl alcohol, polyvinyl-pyrrolidone, or mixtures thereof. For example, a mixture of nickel powder with such processing agent can be spread more quickly and uniformly, and with better filling of the interstices when screens or grids are used, to effect significant cost reductions in fabricating porous sintered nickel plaques. Also, by the invention there is obtained a more uniform product which is substantially free of pin holes, cracks, or other mechanical imperfections. A still further advantage is that the processing agent, which is volatilized during the sintering, operates so as to reduce shrinkage and this increases significantly the percentage porosity of the final sintered product. For example, whereas an 85% porosity has been heretofore obtainable only with extreme care and great skill, plaques are readily made by the invention having porosities from as high as 87% to 90%.

The invention will be more clearly understood with reference to the accompanying drawing wherein the figure shows a perspective view partly broken away of a sintered battery plaque in accordance with the invention.

The plaque 10 shown in the accompanying drawing by way of illustrative example consists of a nickel plated screen grid 11 to which may be affixed an electrical terminal lug 12. The interstices of the screen grid are filled and the sides of the grid are covered with a mixture of nickel powder and about 2% to 25% by weight of either polyvinyl alcohol powder, polyvinylpyrrolidone, or of mixtures of these processing agents. The mixture of the nickel powder with the processing agent is then spread into a mold with a screen grid to a uniform thickness and with a smooth surface, after which it is sintered by heating in a hydrogen atmosphere to about 1500° F. for about 30 minutes or to about 1700° F. for about 10 minutes. Thus, there is formed a smooth uniform plaque of porous sintered nickel metal having for example a reinforcing screen grid embedded therein and integrally bonded therewith.

Details of the invention as herein described are intended to be illustrative and not limitative of the invention since the same are subject to changes and modifications without departure from the scope of my invention, which I endeavor to express according to the following claim.

I claim:

A powdered material to be sintered into porous self-supporting bodies for use as the carriers of the active material of battery electrodes, comprising a mixture by weight of about 75% to 98% nickel powder and of about 25% to 2% of a processing agent selected from the group consisting of polyvinyl alcohol and polyvinylpyrrolidone.

References Cited in the file of this patent

UNITED STATES PATENTS

| | | |
|---|---|---|
| 1,988,861 | Thorausch | Jan. 22, 1935 |
| 2,672,494 | Fleischer | Mar. 16, 1954 |
| 2,679,547 | Fischbach et al. | May 25, 1954 |
| 2,681,375 | Vogt | June 15, 1954 |
| 2,794,845 | Grabe | June 4, 1957 |
| 2,870,234 | Moulton | Jan. 20, 1959 |